Aug. 30, 1955 W. D. GRANNAN 2,716,697
THRIFT COOKER
Filed March 31, 1953 3 Sheets-Sheet 3
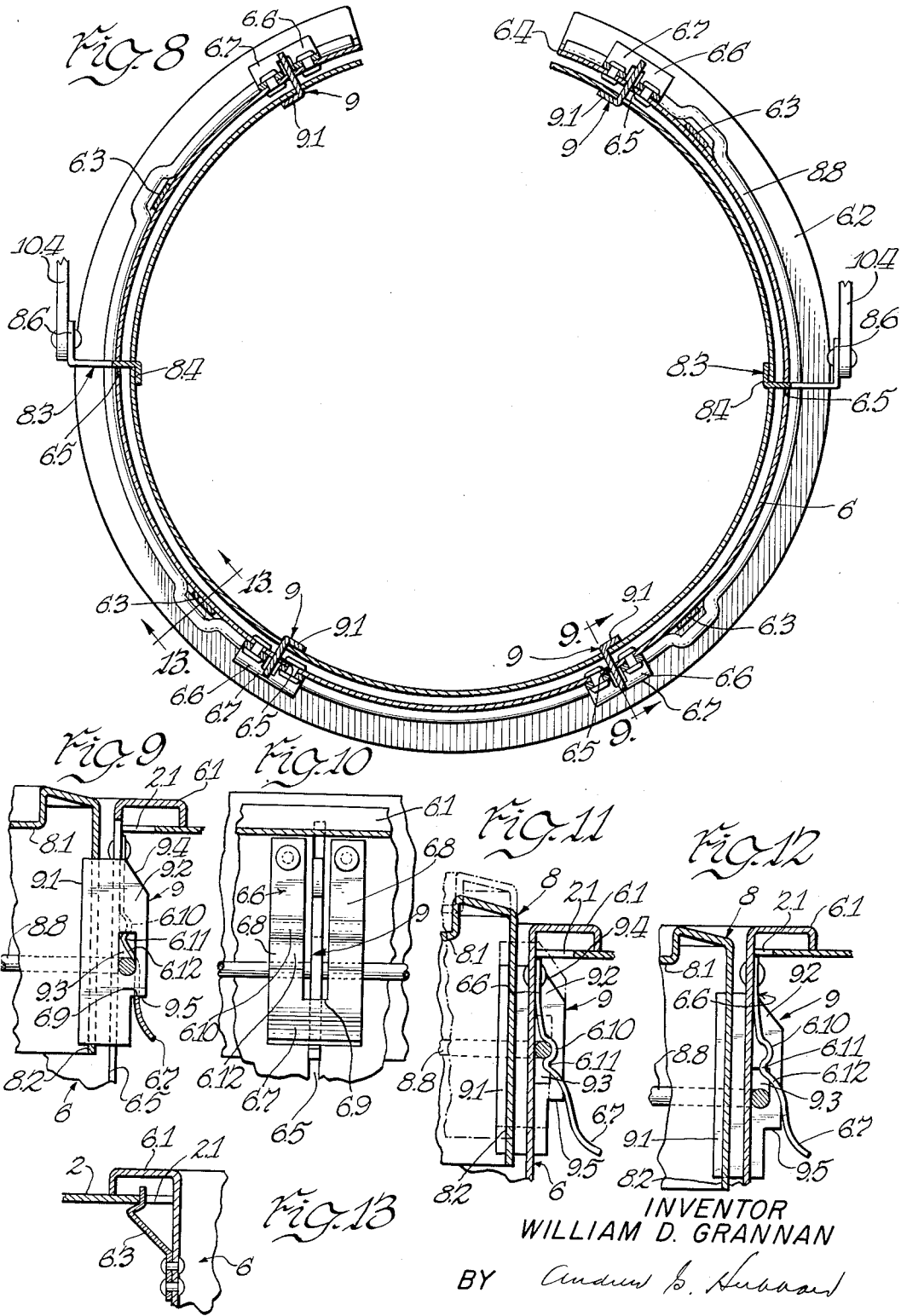
INVENTOR
WILLIAM D. GRANNAN
BY Andrew B. Hubbard
ATTORNEY

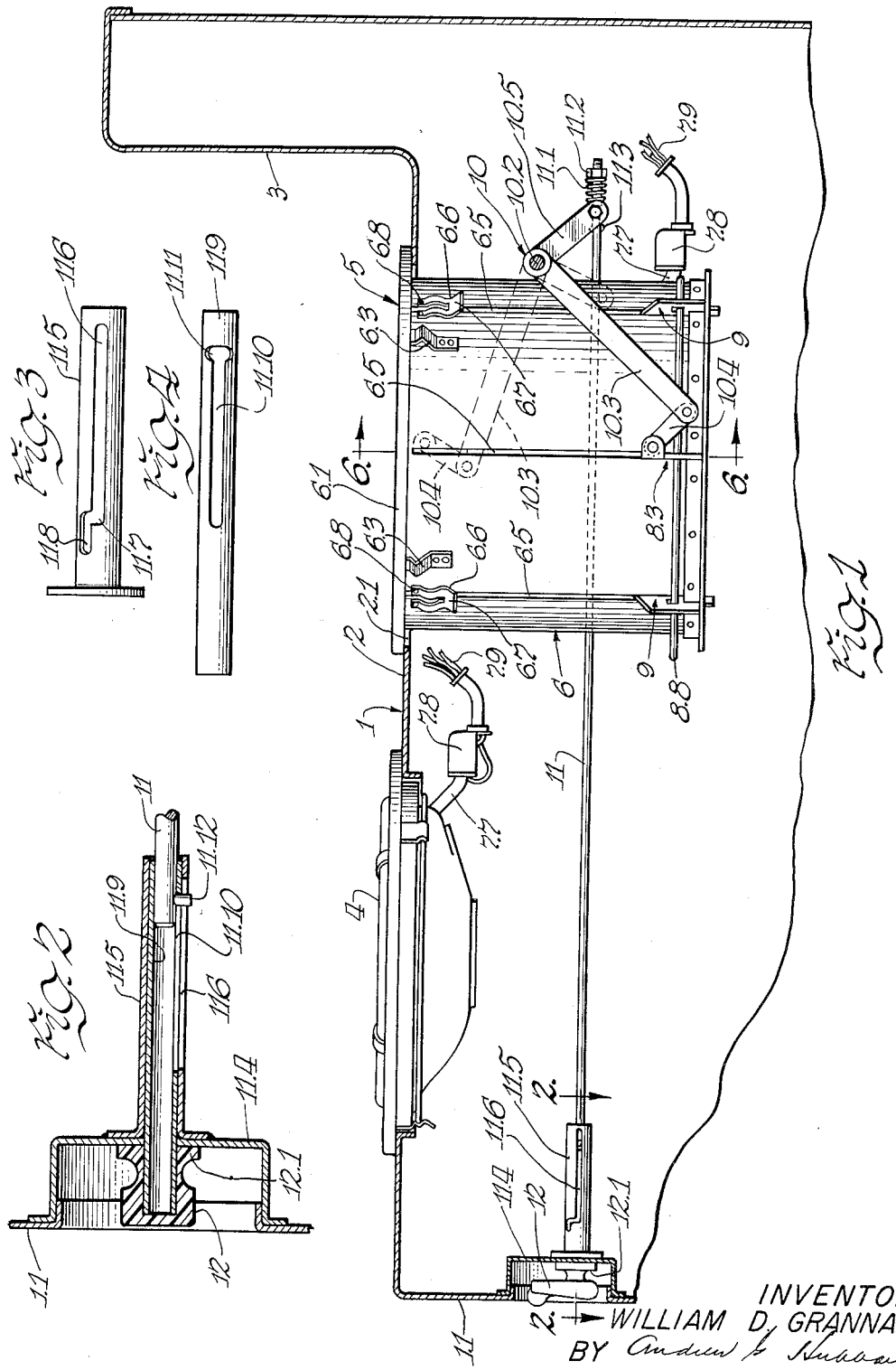

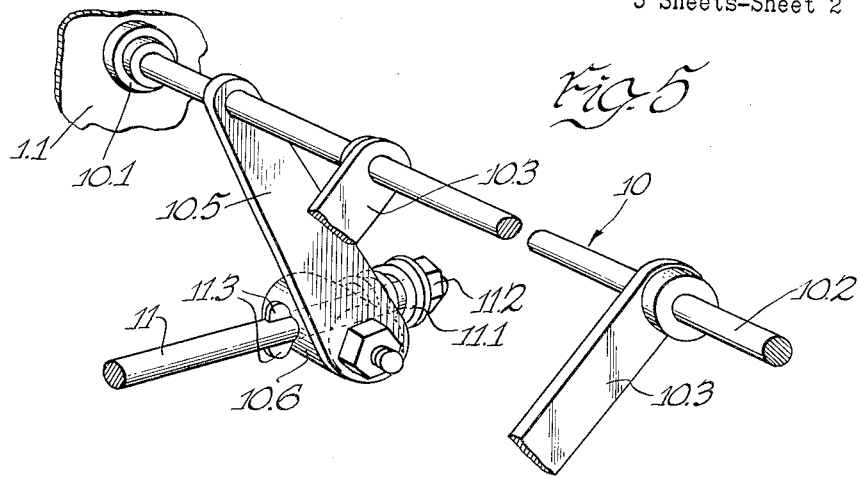
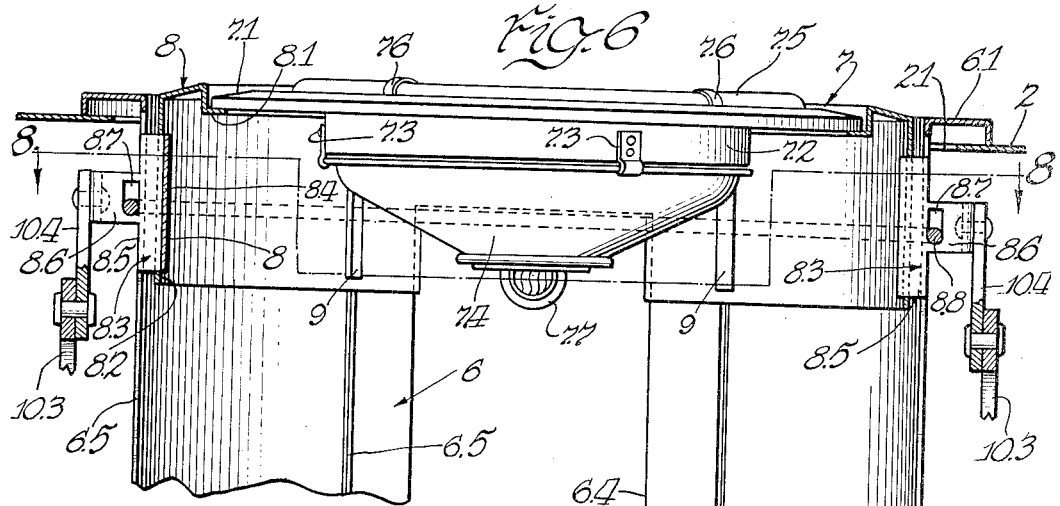
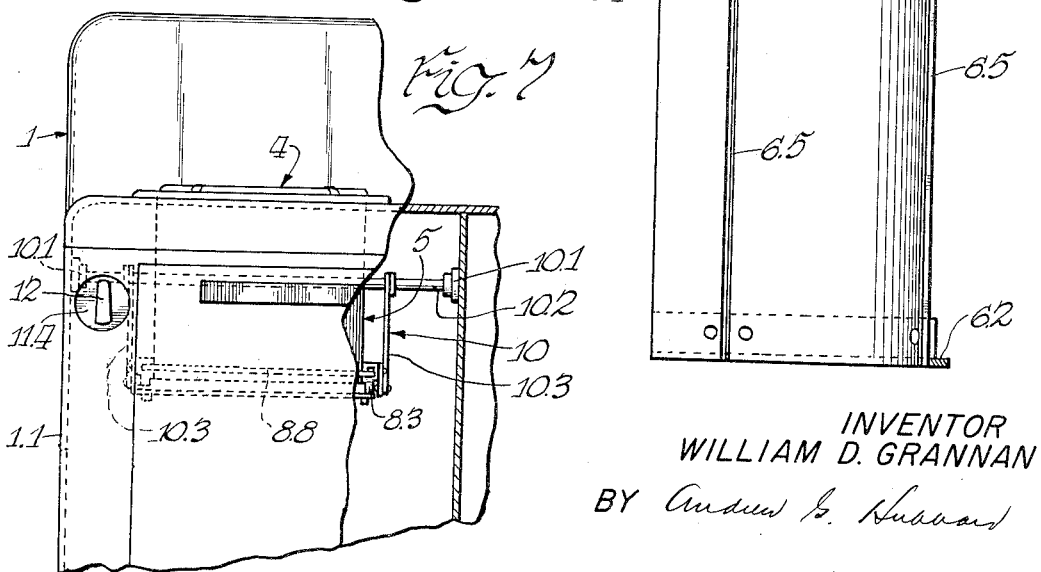

United States Patent Office 2,716,697
Patented Aug. 30, 1955

2,716,697

THRIFT COOKER

William D. Grannan, Des Plaines, Ill., assignor to General Electric Company, a corporation of New York Application March 31, 1953, Serial No. 345,868

11 Claims. (Cl. 219—37)

This invention relates to a combined deep-well and surface cooking unit of an electric range, and in particular to a cooking unit which may be raised from its deep-well to its surface cooking position or lowered from the surface position to the deep-well position by simple mechanism operable from the front of the range.

It is common practice to provide electric ranges with a deep-well cooker in which the heating element is disposed at the bottom of a well several inches in depth. A deep-well cooker is useful as such, but frequently there is a need for an additional surface unit, and many manufacturers have provided means whereby the user may raise the deep-well heating unit and secure it at the cooking surface of the range.

I am aware that various forms of lifting bails, handles and the like have been proposed and used to facilitate raising the heating element and that there are in use certain mechanical devices for raising and lowering the element. In the present invention, I provide a lever and latch arrangement which is operable from the front of the range; the mechanism secures the heating element firmly in its raised position but is nevertheless instantly releasable to lower the element to its deep-well position when desired.

It is therefore a principal object of my invention to provide a deep-well heating element operating mechanism which is simple in construction and operation and capable of assembly and service by unskilled workmen.

It is another object of my invention to provide an operating mechanism as aforesaid having simple latching and release means which hold the element stably in raised position but is instantaneously automatically releasable to permit the heating element to be lowered to its deep-well position.

Other features and advantages of the invention will be apparent from the following detailed description of a presently preferred embodiment thereof read in connection with the accompanying drawings in which:

Fig. 1 is a fragmentary side sectional elevation of an electric range having a combined deep-well and surface cooking unit embodying the invention;

Fig. 2 is a side section elevation on lines 2—2 of Fig. 1 showing a presently preferred arrangement of operating handle and pull rod;

Fig. 3 is a side elevation of the pull-rod guide sleeve;

Fig. 4 is a side elevation of the pull-rod actuator sleeve;

Fig. 5 is a fragmentary perspective of the crank assembly at the deep-well cooking unit;

Fig. 6 is a fragmentary elevation of the deep-well cooking unit in section on lines 6—6 of Fig. 1;

Fig. 7 is a fragmentary front elevation of the cooking range showing a preferred arrangement and location of the operating handle;

Fig. 8 is a plan section taken on lines 8—8 of Fig. 6;

Figs. 9 and 10 are respectively side sectional and front elevations of the latch mechanism showing the arrangement for securing the heating element in raised position, Fig. 9 being taken in section on lines 9—9 of Fig. 8;

Fig. 11 is a side sectional elevation similar to Fig. 10 but showing the latch immediately following the releasing operation;

Fig. 12 is a view similar to Fig. 11 but showing the heating element guide sleeve on its way down after the latch releasing mechanism has been operated; and Fig. 13 is a detail of a suitable spring means for releasably holding the shell of the deep-well unit in operating position with respect to the range cooking surface.

An electric range 1 is fragmentarily and somewhat schematically shown in Fig. 1. The range body construction provides a cooking top 2 and an upstanding rear backsplasher portion 3. In the relatively hollow inner portion of the body, there will, of course, be one or more ovens (not shown), storage compartments (not shown), and drip pans (not shown)—all as well known in the art. The cooking top will ordinarily have a plurality—usually three—of surface cooking units 4 and one deep-well cooker 5. The surface cooking units may be of the type shown in the Vogel et al. Patent 2,565,443 of August 21, 1951, and the deep-well cooker of the general arrangement shown in Kirk U. S. Patent 2,519,051 of August 15, 1950, both patents being assigned to my present assignee. The style and type of the surface cooking units per se and of the heating element of the deep-well cooker are unimportant in themselves. It will be understood that there are provided suitable switches (not shown) disposed on the backsplasher for control of the various heating elements.

Referring now to Fig. 6, the thrift cooker includes a cylindrical well 6 having an outwardly extending flange 6.1 arranged to seat on the range cooking surface 2, and a lower base-forming flange 6.2. It will be noted that the flange 6.1 is substantially larger than the opening 2.1 of the cooking top and that the flange 6.2 is smaller than said opening so as to permit the passage of the well 6 thru the opening. Any convenient means may be provided for securing the well with respect to the range; I prefer to use a suitable plurality of spring clips 6.3 (see Fig. 13) secured to and extending outwardly from the well for releasable engagement with the cooking top structure.

Advantageously the well is fabricated from flat sheet stock and the base flange 6.2 riveted or otherwise secured thereto. It will be observed from Figs. 1 and 6, that the flange 6.2 is not a continuous circular structure because of the fact that the wall of the well 6 has a relatively wide axially extending opening 6.4. The wall additionally has a plurality of symmetrically disposed guide slots 6.5 and the vertical wall of the flange 6.2 is slotted in conformity therewith. The base wall of the said flange is solid thruout its length. As will later appear, the base flange 6.2 is a convenient base for the deep-well heating element in its lower position; the flange 6.2 may or may not be at the base, i. e. bottom, of the well 6.

A plurality—for example four—of latching devices 6.6 are secured about the outer wall of the well 6 near the top thereof, as best shown in Figs. 8 thru 10. The purpose of each device is to dispose a resilient, or resiliently biased latching bar 6.7 across the adjacent guide slot 6.5. A convenient arrangement is to make the 6.7 the base of a U-shaped structure of which the legs 6.8 are riveted to the well structure 6. Above the edge 6.9 of the latching bar, the legs 6.8 are formed with detent pockets 6.10. The ridge portion 6.11 of said detents is at the upper terminal of a ramp 6.12. The bar 6.7 curves outwardly, as seen in Fig. 9. The latching devices are self-biased to move against the side of the well, and as shown in Fig. 9, the ridge 6.11 of the said pockets limits such movement and establishes a uniform spacing of the lower portion of the latching spring with respect to the side wall of the well. It will be noted from Fig. 9 that with the devices in said position, the transition between the latching bar 6.7 and the ramp 6.12 is substantially vertical and parallel to the side of the well.

The deep well cooker heating unit 7 resembles that of the aforementioned Kirk Patent 2,519,051; that is to say, it includes a trim ring 7.1 having the cylindrical skirt 7.2 to which is removably secured as by a plurality of clips 7.3, a combined reflector and drip pan 7.4. A multi-legged spider (not shown) is supported by the skirt 7.2 and provides a base for the coiled heating elements 7.5 to which it may be secured by a plurality of anchorage jaws 7.6 extending upwardly from the legs of the support spider. The electrical leads from the heating element may include a short protective conduit 7.7 and a terminal block 7.8 having a width less than that of the slot 6.4. It is understood, of course, that the leads 7.9 extend to the control switch and are sufficiently flexible to permit free movement of the heating unit between its raised and lowered positions.

The heating unit is supported by a device 8 movable axially within the well 6 between the upper and lower operating positions. Advantageously, the device has a shoulder 8.1 on which the trim ring 7.1 of the unit is based. A relatively deep skirt 8.2 is effective to stabilize the supporting device within the well. Because of the nature and function of the device 8, it will hereinafter be referred to as a guide ring, although it will be obvious that other than ring-like devices may be used. There are affixed to the skirt of the guide ring diametrically opposed lifting brackets 8.3 having a flange 8.4, which is welded or otherwise secured to the inner walls of the skirt, and a vertical plate 8.5 which projects thru the skirt and extends thru a slot 6.5 of the well. Each of the lifting brackets has a tab portion 8.6 formed with a slot 8.7 within which is confined the latch release ring 8.8. The respective tab portions are arranged for pivotal association with lifting arms as presently described. Also disposed about the skirt are latching members 9, best shown in Figs. 9 thru 11, which have flanged portions 9.1 secured to the skirt and vertical plates 9.2 extending radially thru other of the slots 6.5. The plates 9.2 also have elongated openings 9.3 thru which extends the ring 8.8 and it is therefore obvious that the respective openings 8.7 of the lifting brackets and 9.3 of the latching members should be substantially in horizontal alignment. Finally, each latching member plate 9.2 has a ramp 9.4 suitably sloped to provide a cam surface which will engage the sloping bottom portion of the latching bars 6.7 so as to urge the latching device into movement counterclockwise of Fig. 9 as the guide ring 8 is raised to its upper position, and a square shoulder 9.5 which cooperates with the edge 6.9 of the latching bars in the firm support of the guide ring in its upper position.

In order to raise and lower the guide ring 8, I provide a crank organization 10 which is conveniently operated by a pull-out handle accessible at a front column 1.1 of the side of the range body, as shown in Fig. 7. For example, I mount in suitable bearings 10.1, secured to the range body, a rock shaft 10.2 having affixed thereto crank arms 10.3 disposed at opposite sides of the well 6, as seen in Figs. 1 and 8. At its free end each crank arm pivotally carries a link 10.4, the free ends of which are in turn pivotally attached to the tab portions 8.6 of the lifting brackets 8.3. Rock shaft 10.2 is advantageously disposed to the rear of the well 6, about half way between the top and bottom thereof. It will be obvious that rotating the rock shaft in one or the other direction will cause the crank arms to raise or lower the guide ring 8; for it should be remembered that the walls 8.5 of the lifting brackets are guided for free vertical movement in guide slots 6.5 of the well 6.

It will be obvious that various arrangements of mechanisms may be associated with the rock shaft for rotating the same. However, I have found it advantageous to utilize a push rod and means for translating linear motion of the push rod into rotation of the shaft; and I have provided a novel arrangement of the push rod and operating handle or knob thereof.

A crank arm 10.5 is affixed to the rock shaft rearwardly of the column 1.1 of the range body. The free end of arm 10.5 has pivotally secured thereto a slide member 10.6 having an opening thru which slidably passes the end of the actuating rod 11. A coil spring 11.1 interposed between the member 10.6 and a nut or other adjustment-providing stop element 11.2 draws the rod relative to the member 10.6 until said member is engaged by the stops 11.3 provided on the rod. It is apparent that the spring 11.1 provides a resilient lost-motion connection between the rod and the crank arm 10.5.

Fixed to said column 1.1 as by means of a cup-like structure 11.4 secured to the inner wall thereof, is a tubular guide 11.5. Said guide has an axial slot 11.6 at the forward end of which is a sharp branching slot 11.7 communicating between slot 11.6 and a second axial slot 11.8. A sleeve 11.9 fits slidably over the rod 11 and slidably within the guide tube 11.5. Said sleeve has an axially extending slot 11.10 terminating in a T slot 11.11. The sleeve and the pull rod are operatively associated by means of a short pin 11.12 which will ride freely within the slots formed in the sleeve 11.9 and the guide 11.5.

A knob or handle 12 is secured to the end of the sleeve 11.9 and with the knob the user may draw the sleeve outwardly of the range body and rotate it relative to the guide tube 11.5. The shoulder 12.1 at the base of the knob establishes a home position of the knob in which it will be within the cup 11.4.

Under usual conditions of operation when the heating unit 7 is in its lower position, the lowermost edges of the several lifting elements and the latching members affixed to the guide ring 8 rest upon the horizontal wall of the flange 6.2 and the heating unit assembly is firmly supported in its deep-well position. The pull rod 11 will be in its extreme rightward position as viewed in Fig. 1, and by reason of the engagement of pin 11.12 with the end of slot 11.10, the sleeve 11.9 and handle 12 will be in home position. To raise the guide ring 8, the operator draws handle 12 outwardly; the sleeve and pin cooperate to move the rod in the direction causing the crank arms 10.3 to lift the guide ring.

As the ring nears the top of the well, the ramp 9.4 of the several plates 9 engage and cam outwardly the latching devices 6.6 and each plate 9 enters into the slot of its associated latching device. Shortly thereafter the shoulder 9.5 of each latching plate passes the wall 6.9 of the latch bar 6.7 and the bar is snapped into the Fig. 9 position. Each of the plates 9 is therefore held by a latching bar 6.7 and the guide ring and heating element carried thereby are securely supported in surface unit position. The user then returns the knob 12 and its associated sleeve 11.9 to home position. It will be apparent that the pin 11.12 will be at the left end of slot 11.11; and because of the relationship of the sleeve 11.9, the guide tube 11.5 and the respective slots therein, the pin will be at the base of the branch slot 11.7.

To return the heating element to deep-well position, the latching devices must first be rotated outwardly of the well 6 to disengage each latching bar from the shoulder 9.5 of its associated latching plate. This is accomplished by an additional upward movement of the guide ring 8 to carry the release ring 8.8 upwardly of the ramp 6.12, which, of course, biases the devices away from the latching plates.

To raise the guide ring to its unlatching position, the operator draws the handle 12 outwardly until the end of slot 11.10 engages the pin 11.12. The knob is then rotated conterclockwise, as viewed in Fig. 7, to draw the pin along the branch slot 11.7 to the slot 11.8 of the guide tube 11.5, whereupon a further outward pull on the knob will draw the rod 11 outwardly as permitted by slot 11.8. This further rod movement is, of course, translated into a sufficient lift of ring 8 to move the release ring 8.8 into the detent pockets 6.10 of the latching devices. As shown in Fig. 11, this releases the latching plates 9 and the guide ring 8 drops freely to the extent permitted by the length of slots 9.3. This free drop is sufficient to bring the shoulder 9.5 of the latching plates below the upper edge 6.9 of the latch bars 6.7, which are then ineffective to hold the guide ring against further downward movement.

The user must drive the ring downwardly to free the release ring 8.8 from the detent. Again drawing the knob outwardly, he rotates it slightly to bring the pin into the T slot 11.11, then pushes the knob and associated sleeve forwardly to the branch slot 11.7, rotates it again to bring the pin to the slot 11.6 and drives the knob toward the range. The pin 11.12 being engaged in the T slot of sleeve 11.5, the rod 11 will be driven rearwardly within the range to enforce the downward movement of the ring 8 necessary to disengage the release ring 8.8 from the detents. The ring 8 and heating element associated therewith are then free to return without substantial additional effort to its deep-well position. The latching devices 6.7 will automatically return to their home position against the wall of the well.

While I have shown a particular embodiment of my invention, it will be understood, of course, that I do not wish to be limited thereto, since many modifications may be made; and I therefore contemplate by the appended claims to cover any such modifications as fall within the true spirit and scope of my invention.

I claim:

1. A cooking appliance, comprising means providing a cylindrical well extending downwardly from a cooking top, a guide ring disposed within said well and arranged for movement therein between an upper position disposed adjacent the cooking top and a lower position substantially below said cooking top, heating means carried by said guide ring, cooperating latching means carried by said guide ring and said well-providing structure to releasably retain said guide ring in its raised position, crank means carried by said cooking appliance and engaging with said guide ring to raise and lower said guide ring to its respective upper and lower positions within said well, means accessible at the front of said cooking appliance to rotate said crank means in the desired direction, and means effective upon operation of said crank rotating means in a direction effecting a further upward movement of said guide ring from its normal raised position to release said latching means for return of said ring and thereby carried heating element to its lower position in said well.

2. A cooking appliance, comprising means providing a cylindrical well extending downwardly from a cooking top, a guide ring disposed within said well and arranged for movement therein between an upper position disposed adjacent the cooking top and a lower position substantially below said cooking top, heating means carried by said guide ring, spring-biased latching means carried by said well forming means, latching plate members carried by said guide ring for cooperation with said latching means to releasably retain said guide ring in its raised position, crank means carried by said cooking appliance and engaging with said guide ring to raise and lower said guide ring to its respective upper and lower position, means accessible at the front of said cooking appliance to rotate said crank means in the desired direction, and means effective upon further rotation of said crank means in a direction effecting a further upward movement of said guide ring from its normal raised position to urge said latching means away from said latching plate members to release said ring for return to its lower position in said well.

3. A cooking appliance, comprising means providing a cylindrical well extending downwardly from a cooking top, a guide ring disposed within said well and arranged for rectilinear movement therein between an upper position disposed adjacent the cooking top and a lower position substantially below said cooking top, heating means carried by said guide ring, springable latching means carried by said well-providing structure, cooperating latching means fixed to said guide ring and extending thru slots in said structure for cooperation with said first-named latching means to releasably retain said guide ring in its raised position, crank means carried by said cooking appliance and engaging with said guide ring to raise and lower said guide ring within said well, a pull rod accessible at the front of said cooking appliance to rotate said crank means in the desired direction, and means effective upon further rotation of said crank means in a direction effecting a further upward movement of said guide ring from its normal raised position to urge said springable latching means out of engagement with said second-named latching means for return of said ring and thereby carried heating element to its lower position in said well.

4. In a cooking appliance having body structure providing a cooking top formed with an opening, the combination comprising a cylindrical structure providing a vertical well substantially the diameter of said opening, latching means including a plurality of springable latching bars disposed about said well near the upper portion thereof, said latching bars being fixed at one end to said well and having outwardly and downwardly sloping free end portions, a guide ring disposed within said well for travel therein between raised and lowered positions, said guide ring having latching means engageable with said latching bars to hold said guide ring releasably at the upper portion of said well, a heating element carried by said guide ring and disposed thereby in operative position at said cooking top when said guide ring is at said upper well position, means for moving said guide ring between raised and lowered positions, and release means carried by said guide ring latching means and engageable with said sloping end portions of said latching bars upon further upward movement of said guide ring to cam said latching bars outwardly to disengage from said latching means.

5. In a cooking appliance having body structure providing a cooking top formed with an opening, the combination comprising a cylindrical structure providing a vertical well substantially the diameter of said opening, latching means including a plurality of springable latching bars disposed in a common horizontal plane in mutually spaced relation about said well and having latching portions extending transversely of the axis thereof, said latching bars being spring biased for movement toward the wall of said well, a guide ring disposed within said well for travel longitudinally thereof, said guide ring having latching members having means engageable with said latching bars to hold said guide ring releasably at the upper portion of said well, a heating element carried by said guide ring and disposed thereby in operative position at said cooking top when said guide ring is at said upper well position, means for moving said guide ring between raised and lowered positions, and means carried by said latching members and disposed between said well and said latching bars and responsive to a further upward movement of said guide ring from its latched position to separate each said latch bar from its associated latching member to prepare said guide ring and heating element carried thereby for return movement to the base of said well.

6. In a cooking appliance having body structure providing a cooking top formed with an opening, the combination comprising a cylindrical structure providing a vertical well substantially the diameter of said opening, said cylindrical structure having a plurality of upwardly extending guide slots, latching means including a plurality of springable latching bars disposed in a common horizontal plane in mutually spaced relation about said well and extending transversely of said guide slots, said latching bars being spring biased for movement toward the wall of said well, a guide ring disposed within said well for travel longitudinally thereof, said guide ring having latching members extending through said guide slots and having means engageable with said latching bars to hold said guide ring releasably at the upper portion of said well, a heating element carried by said guide ring and disposed thereby in operative position at said cooking top when said guide ring is at said upper well position, means for moving said guide ring between raised and lowered positions, and means carried by said guide ring latching members and responsive to a further upward movement of said guide ring from its latched position to disengage each latch bar from its associated latching member to prepare said guide ring and heating element carried thereby for return movement to the base of said well, said latch bar disengaging means holding said latch bars in disengaged position during the first portion of said return movement.

7. In a cooking appliance having body structure providing a cooking top formed with an opening, the combination comprising a cylindrical structure providing a vertical well substantially the diameter of said opening, said cylindrical structure having a plurality of axially extending slots therein, a plurality of U-shaped, springable latching means fixed to said cylindrical structure and providing latching bars disposed in a common horizontal plane and extending transversely of said slots, said latching means being biased for movement of said latching bars toward the wall of said well, a guide ring disposed within said well for travel longitudinally thereof, said guide ring having latching members having means engageable with said latching bars to hold said guide ring releasably at the upper portion of said well, a heating element carried by said guide ring and disposed thereby in operative position at said cooking top when said guide ring is at said upper well position, means for moving said guide ring between raised and lowered positions, and a rigid member carried by said guide ring latching members and extending transversely of the leg portions of said latching means to engage said leg portions upon a further upward movement of said guide ring from its latched position to urge said latching bars out of contact with said latching members to prepare said guide ring and heating element carried thereby for return movement to the base of said well.

8. In a cooking apparatus having body structure providing a cooking top formed with an opening, the combination comprising a cylindrical structure providing a vertical well, said structure having a plurality of axial slots extending substantially the full height thereof, a plurality of U-shaped, springable, latching devices secured to said cylindrical structure, the legs of each said device being disposed on opposite sides of a slot and the base of the U extending across the slot to form a latching bar, said devices being self-biased to move the latching bars thereof in a uniform direction relative to said cylindrical structure, means fixed to said structure establishing a base thereof, a guide ring disposed within said well for travel between said base and an upper position adjacent said cooking top, latching plates fixed to said guide ring and extending through said axial slots, each said plate having a shoulder for releasable engagement with a latching bar and a cam surface above said shoulder to engage said bar during upward movement of said guide ring to flex said latching devices into a position from which they will react to a position supporting said latching plates by the shoulders thereof upon further upward movement of said guide ring and thereby retain said guide ring in elevated position, a heating element carried by said guide ring and disposed thereby in operative position at said cooking top when said guide ring is in elevated position, a rigid member operatively associated with said guide ring latching members and effective upon further upward movement of said guide ring to flex said latching devices into a position releasing said shoulders and thus prepare said guide ring for movement to its lower position, and means for raising and lowering said guide ring.

9. In a cooking apparatus having body structure providing a cooking top formed with an opening, the combination comprising a cylindrical structure providing a vertical well, said structure having a plurality of axial slots extending substantially the full height thereof, a plurality of U-shaped, springable, latching devices secured to said cylindrical structure, the legs of each said device being disposed on opposite sides of a slot and the base of the U extending across the slot to form a latching bar, said devices being self-biased to move the latching bars thereof in a uniform direction relative to said cylindrical structure, means fixed to said structure establishing a base thereof, a guide ring disposed within said well for travel between said base and an upper position adjacent said cooking top, latching plates fixed to said guide ring and extending through said axial slots, each said plate having an elongated opening and a shoulder for releasable engagement with a latching bar and a cam surface above said shoulder to engage said bar during upward movement of said guide ring to flex said latching devices into a position from which they will react to a position supporting said latching plates by the shoulders thereof upon further upward movement of said guide ring and thereby retain said guide ring in elevated position, a heating element carried by said guide ring and disposed thereby in operative position at said cooking top when said guide ring is in elevated position, a rigid release ring threaded through the elongated openings of said latching plates and carried by said latching plates during further upward movement of said guide ring to engage and to flex said first-named latching devices into a position releasing said shoulders and thus prepare said guide ring for movement to its lower position, the length of said latching plate slots being such that while the release ring is holding the latching devices in said flexed position, the guide ring may drop to a position in which the latching bars cannot again move beneath the shoulders of said latching plates to restrain downward movement of said guide ring, and means for raising and lowering said guide ring.

10. Apparatus according to claim 9, in which the legs of said U-shaped latching devices are sloped to form camming surfaces effective to translate vertical motion of said release ring into movement of said latching devices into said shoulder releasing position.

11. Apparatus according to claim 9, in which the legs of said U-shaped latching devices have detent portions to retain said release ring during the initial downward movement of said guide ring following release of said latching plates by said latching bars.

References Cited in the file of this patent

UNITED STATES PATENTS

| | | |
|---|---|---|
| 2,025,252 | Stencell | Dec. 24, 1935 |
| 2,126,234 | Weber | Aug. 9, 1938 |
| 2,257,580 | Trompeter | Sept. 30, 1941 |
| 2,498,651 | Crom | Feb. 28, 1950 |
| 2,519,051 | Kirk | Aug. 15, 1950 |
| 2,543,510 | Sandberg | Feb. 27, 1951 |
| 2,631,470 | Sandberg | Mar. 17, 1953 |

FOREIGN PATENTS

| | | |
|---|---|---|
| 988,924 | France | Sept. 3, 1951 |